United States Patent [19]

Smith

[11] Patent Number: 5,351,298

[45] Date of Patent: Sep. 27, 1994

[54] CRYPTOGRAPHIC COMMUNICATION METHOD AND APPARATUS

[76] Inventor: Peter J. Smith, 25 Lawrence Street, Herne Bay, Auckland, New Zealand

[21] Appl. No.: 953,832

[22] Filed: Sep. 30, 1992

[30] Foreign Application Priority Data

Sep. 30, 1991 [NZ] New Zealand .................... 240019

[51] Int. Cl.$^5$ .................... H04L 9/28; H04L 9/30
[52] U.S. Cl. .................... 380/30; 380/28
[58] Field of Search .................... 380/30, 28

[56] References Cited

U.S. PATENT DOCUMENTS

| | | | |
|---|---|---|---|
| 4,218,582 | 8/1980 | Hellman et al. .................... | 380/30 |
| 4,731,841 | 3/1988 | Rosen et al. .................... | 380/30 |
| 5,146,500 | 9/1992 | Maurer .................... | 380/30 |
| 5,159,632 | 10/1992 | Crandall .................... | 380/30 |
| 5,166,978 | 11/1992 | Quisquater .................... | 380/30 |

*Primary Examiner*—Salvatore Cangialosi
*Attorney, Agent, or Firm*—Young and Thompson

[57] ABSTRACT

A public key cryptographic system uses Lucas functions as the basis for encoding and decoding messages. An encoding device and a decoding device are linked by a communication channel. The first device is able to be actuated by some message to be transmitted, M, as well as an encryption key, E, so as to form a cryptogram, C, so that C can be sent over the communication channel to a decoding device. The encryption key, E, is a pair of positive whole numbers, e and N, which match the decryption key, D, of the second decoding device. The message M must usually be broken down into blocks, $M_i$, such that each is greater than or equal to zero and less than or equal to $N-1$. N is a composite number—i.e. it is made up of at least two prime numbers, p and q, such that $N=p\cdot q$. The cryptographic transformation done by the encoding device can be described using the notation of Lucas functions. It is, for each ith block of message M which produces a matching ith block of the cryptogram C:

$$C_i = V_e(M_i, 1)(modulo\ N)$$

where e has been chosen to be relatively prime to all of $(p-1)$, $(q-1)$, $(p+1)$ and $(q+1)$.

10 Claims, 7 Drawing Sheets

CRYPTOGRAPHIC COMMUNICATION METHOD AND APPARATUS

FIELD

This invention relates to the security of communications, and has particular application to public key systems.

BACKGROUND

The advent of computers, especially micro-computers, has led to a huge proliferation of communications systems, whether private or public. Private applications include the use of networks within a business or other single organization, and public ones include the provision of such things as automated teller machines by banks, as well as the provision of telephony.

In many cases the communications channels are susceptible to interlopers, who may have malicious or mischievous intent. Valuable information can be intercepted and data can be extracted without its legitimate users being aware of its loss.

It is often important to be able to protect sensitive information over large networks whether they are private or public. It is also important that the originators of information should be unable to deny that they sent it.

The prior art has seen rapid progress in the last twenty years. A first step towards providing widespread data security was the adoption in the United States of the Data Encryption Standard (DES), which was mandated as a published cipher by the National Bureau of Standards (see US Federal Register, Mar. 17, 1975, Volume 40, No. 52, and Aug. 1, 1975, Volume 40, No. 149). Use of the DES in such things as banking transactions is regarded as the due exercise of care under US law.

DES is a conventional cipher, inasmuch as the encrypting key must be the same as the decrypting key. The security of DES depends on the key being kept secure, so that if two parties wish to communicate they must arrange a safe way of establishing their common key. This is usually done by means of a courier who must physically travel between two points.

These problems of cost and time join those that arise if two parties wishing to communicate privately have had no previous contact, or when one party wishes to communicate with a lot of others at the same time.

Another problem with a cipher such as the DES is that receivers can send themselves messages which appear to come from a genuine sender. This is possible because of the key duplication (See M. E. Hellman, "The mathematics of public-key cryptography" Scientific American, Volume 241, No. 2, August 1979, pp 130–139.)

In 1977 Diffie and Hellman put forward the idea of a public key system (PKS) for cryptographic communications. In this type of cipher, the keys are not the same at each end of a communications link. In fact, half of the key can be published, in either a telephone book, or newspaper. (See "New directions in cryptography", IEEE Transactions on Information Theory, Volume IT-22, No. 6, November 1976, pp 109–112.)

Anyone wishing to communicate with someone who used a PKS would be able to obtain their public key, encrypt their message with it, and only the intended recipient would be able to decrypt it by using their secret key. This secret key is the other half of the public key. A sender can use their private key to sign a message, as, when decrypted with their known public key half, the message could only have originated with the holder of the private key. Hence the sender is unable to deny sending the signed message.

Within a year, Rivest, Shamir, and Adleman published the first practical PKS, known for the inventors as the RSA. (See R. Rivest, A. Shamir, L. Adleman, "A method for obtaining digital signatures and public key cryptosystems", Commun. ACM, 21 (1978) 120–126.)

The inventors gained a United States patent for their method (U.S. Pat. No. 4,405,829 granted Sep. 20, 1983) and the RSA cipher has been successfully implemented throughout the world.

The success of this cipher has led to increasing research into its cryptographic strength. These have largely led to strengthenings of the RSA, as attacks on the cipher have usually been easily countered.

The RSA is based on an exponential or "first order" linear recurrence, and could be vulnerable because of its multiplicative nature. The signature of a product is the product of the signatures. If M is one message, and N another sent by the same sender using the same key, with d being the exponent (or secret key), then this multiplicative nature can be illustrated like this:

$$M^d \cdot N^d = (M \cdot N)^d$$

R. L. Rivest, writing as co-author of a 1988 paper, states that "The RSA scheme is selectively forgeable using a directed chosen-message attack, since RSA is multiplicative..." A selective forgery is a forged signature for a particular message chosen beforehand by the interloper. Although interlopers may be unable to decode messages, they may be able to recombine or reuse individual messages for which they have learned both the original message and the cipher, including the signatures of other people. Thus with reference to the example above, an interloper who knows both original messages M and N, and their cryptograms, can create and correctly encode a third message $M \cdot N$ without requiring knowledge of the key d. As the paper states, this aspect of the RSA can be protected against by padding out the message space with a "reasonably long checksum" among other ways. (See S. Goldwasser, S. Micali, R. L. Rivest, "A secure digital signature scheme" SIAM J. Comput., Volume 17, No. 2, April 1988, pp 281–308.)

This usually means that signed message must have other extraneous characters added in to protect RSA signatures against selective forgery.

OBJECT

With the foregoing in mind it is an object of this invention to provide an improved public key cryptographic system, or one which will at least provide the public with a useful choice.

SUMMARY OF THE INVENTION

In one aspect, this invention provides an encoding mechanism and a decoding mechanism using higher order linear recurrences, with the two linked by a communication channel.

In another aspect the invention provides cryptographic means for use in the encryption of communications, including an algorithm which includes the use of higher order linear recurrences to encode a message as a cryptogram, whereby the cryptogram comprises a non-multiplicative function of the message.

In its preferred form, the invention uses Lucas functions, modulo N (a composite number) as an exemplary form of higher order linear recurrences to encode and decode a message and in which the decoding key is derived from prime factors of N.

Preferably a message is encrypted by use of an encryption key to form a cryptogram, which can be decrypted by use of a decryption key, wherein:

the encryption key includes a pair of encryption numbers e and N;

the decryption key includes a set of decryption numbers d;

and the decryption numbers of the set d are derived from e and at least two prime factors p and q of N.

The message must first be "digitized" with a simple substitution of numerals for letters, to form a numerical message M. This must then be broken down into blocks, $M_i$, such that each comprises a number greater than or equal to zero and less than or equal to N−1. N is a composite number—i.e. it is made up of at least two prime numbers, p and q, such that $$N = p \cdot q$$

Preferably N is at least $10^{150}$.

The cryptographic transformation done by the encoding mechanism can be described using the notation of Lucas functions. It is, for each block $M_i$ of message M which produces a matching block $C_i$ of the cryptogram C:

$$C_i = V_e(M_i, 1) \ (modulo \ N)$$

where e has been chosen to be relatively prime to all of (p−1), (q−1), (p+1) and (q+1);
and $V_e$ is the Lucas function of e.

The decoding device, having received the cryptogram, C, is actuated to perform a similar transformation to that above, converting C into M′. For this it uses a decryption key, D, which is made up of N, as above, and at least four positive whole numbers, $d_j$, where j = 1, 2, 3 or 4.

These four numbers are responsive to the numerical nature of the particular cryptogram block, $C_i$, in the following manner.

$$\Delta_i = C_i^2 - 4.$$

Letting $\Delta_i$ be the result when $C_i$ is squared, and then subtracting four from the product, it is then necessary to determine whether this $\Delta_i$ is either a quadratic residue or a quadratic non-residue of each of the prime factors of N.

This leads, in the exemplary case of two prime factors for N, to the situation described by the following four cases:

CASE 1

$\Delta_i$ can be a quadratic residue of both p and q;

CASE 2

$\Delta_i$ can be a quadratic residue of p and a quadratic non-residue of q;

CASE 3

$\Delta_i$ can be a quadratic non-residue of p and a quadratic residue of q;

CASE 4

$\Delta_i$ can be a quadratic non-residue of both p and q.

The value of $d_j$ is now chosen in relation to these cases:

CASE 1: $d_1$ is the multiplicative inverse of e, modulo the least common multiple of (p−1) and (q−1);
CASE 2: $d_2$ is the multiplicative inverse of e, modulo the least common multiple of (p−1) and (q+1);
CASE 3: $d_3$ is the multiplicative inverse of e, modulo the least common multiple of (p+1) and (q−1);
CASE 4: $d_4$ is the multiplicative inverse of e, modulo the least common multiple of (p+1) and (q+1).

Letting $L_j$, for j = 1 through 4, be the least common multiple in the four cases, then this can be put:

$$e \cdot d_j = 1 \ (modulo \ L_j), \ j = 1, 2, 3, \ or \ 4.$$

The transformation of cryptogram C into M′ is then accomplished for each block $C_i$ of C by $$M'_i = V_{d_j}(C_i, 1) \ (modulo \ N),$$

where j = 1, 2, 3, or 4.

With these steps taken, the encoding and decoding devices have enabled a message to be transformed into a cryptogram by the encoding device, and then transformed back to a plain message by the decoding device such that M = M′ (modulo N), where M is the original message and M′ is the transformed cryptogram.

In another aspect the present invention provides a public key cryptographic system including:

first and second communicating terminals arranged to function respectively as a transmitting and a receiving terminal;

cryptographic means comprising an encoding device at said first terminal and a decoding device at said second terminal;

wherein a message is encrypted by use of an encryption key to form a cryptogram, which can be decrypted by use of a decryption key, wherein the encryption key includes a pair of encryption numbers e and N, and the decryption key includes a set of decryption numbers d, and the decryption numbers of the set d are derived from e and at least two prime factors p and q of N;

wherein said first terminal is provided with the encryption key including encryption numbers e and N, and said second terminal is provided with the decryption key including the set of numbers d;

and wherein said encryption key is made public.

In a communication system which is adapted to provide digital signatures, each transmitting and receiving terminal is provided with both an encoding and decoding device, each device being functionally equivalent to the devices described above but operating on a different set of input words with a different key. The transmitting terminal decoding device transforms a message M using its own decoding key to generate a signed message $M_s$. Then the encoding device transforms the resultant signed message $M_s$ with the intended receiving terminal's encoding key to generate signed ciphertext word $C_s$. The receiving terminal's decoding device then transforms the received $C_s$ with its own decoding key to obtain the signed message $M_s$, and then the encoding device transforms the resultant signed message with the transmitting terminal's encoding key to obtain the original message.

For example, in an arrangement for sending signed messages from person A to person B, A's apparatus includes at least one encoding device with encryption key $E_B=(e_B, N_B)$ and at least one decoding device which has decryption key $D_A=(d_{Aj}, N_A)$, with $j=1$ through 4.

In a similar manner B's apparatus includes an encryption device with an encryption key $E_A=(e_A, N_A)$, and a decryption key $D_B=(d_{Bj}, N_B)$, $j=1, 2, 3,$ or 4.

Now, person A forms the signed message $M_s$ $$M_s = V_{d_A}(M, 1) \text{ (modulo } N\text{)}.$$

This is now transformed into the cryptogram $C_s$ $$C_s = V_{e_B}(M_s, 1) \text{ (modulo } N\text{)}.$$

which is then sent to person B. Person A can use their own $d_A$ and $N_A$ from their own decryption keys, and obtain $e_A$ and $N_A$ from the public directory in which they are published.

On receipt of the cryptogram, $C_s$, person B first decrypts it into the signed message, $M_s$, in this manner:

$$M_s = V_{d_B}(C_s, 1) \text{ (modulo } N_B\text{)}.$$

and then converts $M_s$ into the original message M:

$$M = V_{e_A}(M_s, 1) \text{ (modulo } N_A\text{)}.$$

Person B can use their own $d_B$ and $N_B$ from their own decryption keys, and obtain $e_A$ and $N_A$ from the public directory in which they are published.

In any of the above operations, the underlying messages may be initially encoded using conventional encryption techniques, and the subsequently decoded messages may be decoded using a corresponding decryption technique. The present invention may be used with any length messages provided that the message is broken into suitable length blocks before encoding. For example, very long messages may readily be broken into blocks, with each block labeled with a "this is block t of R" notation and transmitted after signing each block separately. Any word to be transformed, using either the encoding or decoding key for a terminal, must be broken into blocks, wherein each block is representative of a number in the range 0 to N for the corresponding terminal. Following transmission over the channel and the second transformation, the resultant words may readily be "unblocked".

The present invention provides a public key system for establishing private communications and also for providing private communications with the signature. A characteristic of this system is that the public revelation of the encryption key does not reveal the corresponding decryption key. As a result, couriers or other secure means are not required to transmit keys, since a message can be enciphered using an encryption key publicly revealed by the intended recipient. Only the intended recipient can decipher the message since only he knows the corresponding decryption key. Furthermore, the message can be "signed" by deciphering it with the privately held decryption key. Anyone can verify the signature using the corresponding to the originator. Signatures cannot be forged and the signer cannot later deny the validity of his signature.

In other forms, the present invention may be utilized with both the encoding and decoding keys secret. In one such form, if users A and B wish to communicate privately over an insecure channel, they may use the channel to transmit $E_A$ and $E_B$ to B and A, respectively. Then when A wishes to send B a message M, he first produces $E_B(M)=C$ and sends this to B. B applies $D_B$ to C to obtain M. An eavesdropper on the channel will have access to $E_B$, $E_A$ and C but without access to $D_B$ is unable to decode C. This example demonstrates the principle of replacing exponentiation in such systems with the calculation of Lucas functions, and those skilled in the prior art will be able to see other systems where the same replacement can be done.

In alternative forms, the present invention may be utilized with the encoding and decoding devices coupled by a data path to a memory so that encoded only, or encoded signed, data words may be stored in the memory, thereby ensuring file integrity. In such an embodiment, the data path and memory are considered to be a communications channel coupling the encoding and decoding devices (which devices may be at remote locations or at the same physical location).

In another aspect, the present invention provides a method of communicating, and a method for encrypting communications, using the means described above.

These and other aspects of this invention, which should be considered in all its novel aspects, will be apparent from the following descriptions, in which:

PREFERRED EMBODIMENTS

Figure 1:
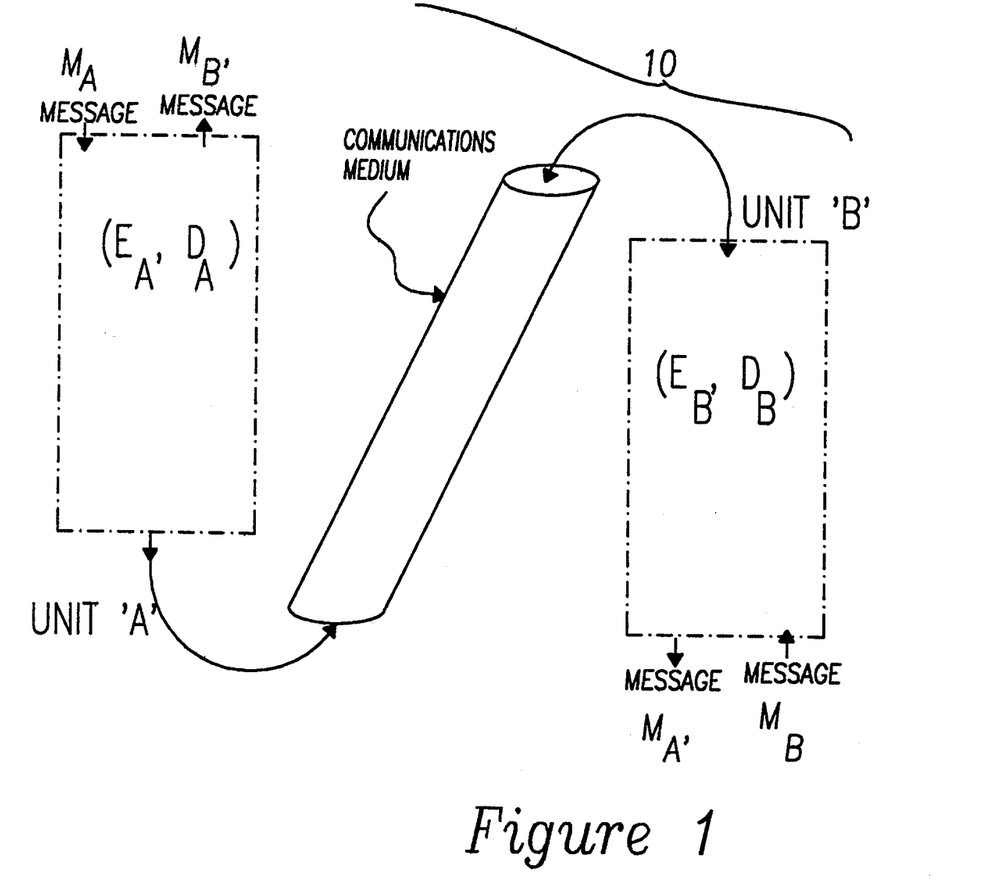
FIG. 1: is a diagram of a two-way communications channel carrying encrypted messages between unit/terminal A and unit/terminal B.

FIG. 1 shows an embodiment of the present invention in block diagram form. This system includes a communications channel 10 and two terminals—unit A and unit B coupled to the channel, where each terminal has an associated encoding key E and decoding key D: $E_A$, $D_A$, respectively, for terminal A and $E_B$, $D_B$, respectively, for terminal B. The communications channel 10 may comprise, for example, one or more items selected from: a conventional broad-band cable with associated modulator and demodulator equipment at the various remote terminals to permit data transfer between terminals connected to the channel and the channel itself. The system of FIG. 1 is suitable for the two-way transfer of messages between terminal A and terminal B. Each of terminals A and B is adapted to transform a plaintext message to an encoded form and transfer the encoded message over channel 10 to the other terminal. When received at the other terminal, the encoded message is transformed back to its plaintext form. In the figures, the message, encoded form and reconstituted plaintext are represented by the symbols M, C, and M', respectively, with subscripts A or B being representative of the originating terminal.

In one embodiment (e.g. the system of FIG. 2 described below), the encoded form of the message is encrypted to ciphertext that may only be decoded by the intended receiver terminal. In a second embodiment, the encoded form is representative of a message combined with a digital signature indicative of the sending terminal. In a third embodiment (e.g. the system of FIG. 5 described below), the encoded form is both encrypted to a form intelligible only to the intended receiver and also signed by the sending terminal. Alternative forms of systems may include additional remote terminals (each having associated encoding and decoding keys) coupled to the channel 20, as well as associated terminal and channel equipment so that messages may be addressed to particular ones of the terminals in a conventional manner or broadcast to a number of terminals at one time.

Figure 2:
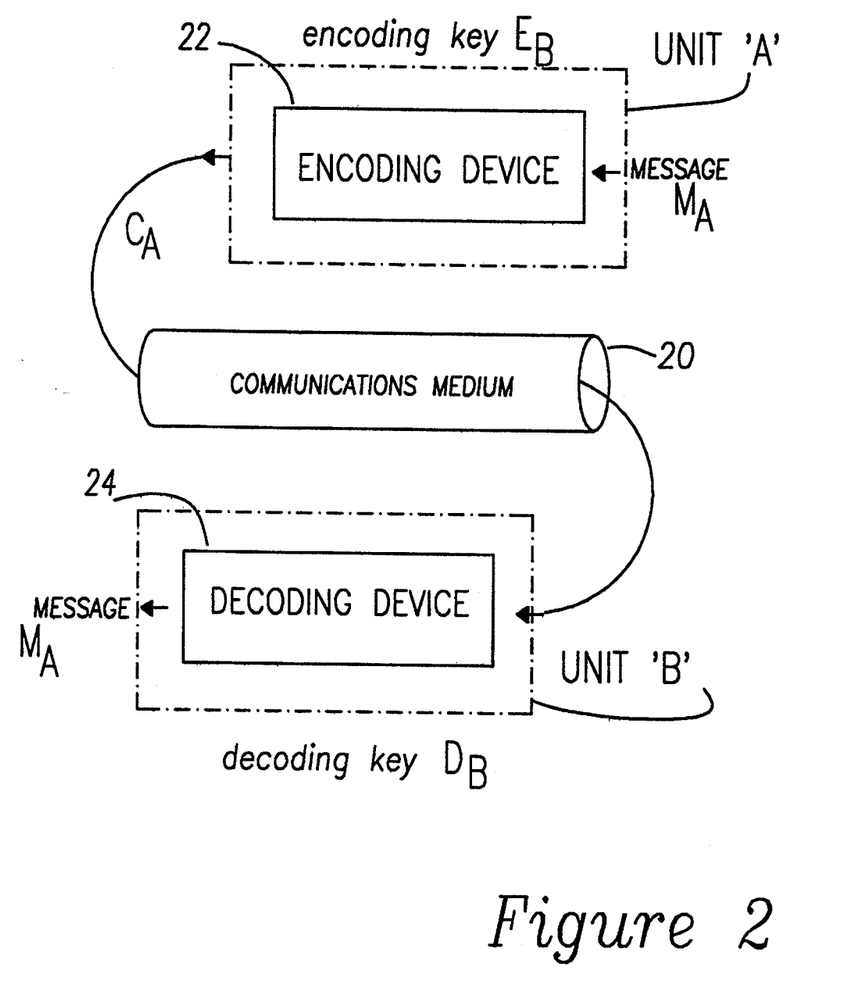
FIG. 2: is a diagram of a one-way communications channel carrying encrypted messages from unit/terminal A to unit/terminal B.

FIG. 2 shows a form of the invention wherein messages $M_A$ may be transferred in encrypted form in one direction from terminal or unit A to terminal or unit B. In this embodiment, terminal A includes an encoding device and terminal B includes a decoding device. This form is relevant to applications such as the secure distribution of computer software.

The encoding device is adapted to receive an input message $M_A$ to be transferred to the terminal or unit B. Message $M_A$ may be pre-coded by conventional encoding techniques to a digital form. In embodiments where relatively large messages are being utilized, the pre-coded form may be in terms of short data blocks which may be individually encoded by the encoding device into corresponding words of ciphertext $C_A$. To establish communications with terminal B, the encoding device performs the transformation from $M_A$ to $C_A$ utilizing the terminal B encoding key, $E_B$ (defined more fully below) . The decoding device receives ciphertext words $C_A$ from the channel 20 and transforms them into reconstituted plaintext from $M_A$ utilizing the terminal B decoding key, $D_B$ (defined more fully below). The encoding and decoding keys are adapted so that the decoded message $M_A$, is the same as the message $M_A$. To establish communication with any other terminal, the encoding device 22 within the sending terminal utilizes the encoding key associated with the intended receiver terminal. The decoding device 24 of the receiving terminal utilizes its own decoding key to transform the received ciphertext to plaintext.

Relating to the present invention, associated with the ith terminal the encoding key $E_i$ is a pair of positive whole numbers $e_i$ and $N_i$ which are specific to that terminal, and the decoding key specifically associated with that terminal is at least five positive whole numbers $d_{ij}$ and $N_i$, $j=1$ through 4.

Further relating to the present invention, the number $N_i$ is a non-prime equal to the product of at least two prime numbers, $p_i$ and $q_i$, and is part of both encrypting and decrypting keys. The encrypting key, $e_i$, is relatively prime to all of $(p_i-1)$, $(q_i-1)$, $(p_i+1)$, and $(q_i+1)$.

The four decrypting keys, $d_{ij}$, $j=1$ through 4, are respectively the multiplicative inverses of $e_i$ modulo the four possible least common multiples made up by combining one at a time a selection from both of $(p_i-1)$ or $(p_i+1)$ and $(q_i-1)$ or $(p_i+1)$.

The encrypting transformation done by the ith terminal encoding device with a message addressed to the mth terminal is in accordance with the relation $$C_i = V_{em}(M_i, 1) \ (modulo\ N_m).$$

Accordingly, the encoding device 22 of unit A and decoding device 14 of unit B perform substantially the same functional operation but with different message inputs (M or C) and different keys (E or D). In the present exemplary embodiment this is one which transfers an encrypted message from terminal A to terminal B, $i=A$ and $m=B$.

The FIG. 2 embodiment is also suitable for sending signed messages $M_{As}$ (in lieu of $C_A$) from terminal A to terminal B. In this form, the system of FIG. 2 is substantially the same as that described above except that terminal A utilizes its own decoding key $D_a$ as the "encoding key" for device 12, and terminal B utilizes terminal A's encoding key for the "decoding key" for device 14. With this configuration, $M_A$ is in the range $0 = M_A = n_A - 1$ and terminal A transforms the message $M_A$ to $M_{As}$ in accordance with:

$$M_{As} = V_{dA}(M_A, 1) \ (mod\ N_A)$$

and terminal B transforms the received signed message $M_{As}$ back to $M_A$ in accordance with $$M_A = V_{eA}(M_{As}, 1) \ (mod\ N_A)$$

Figure 3:
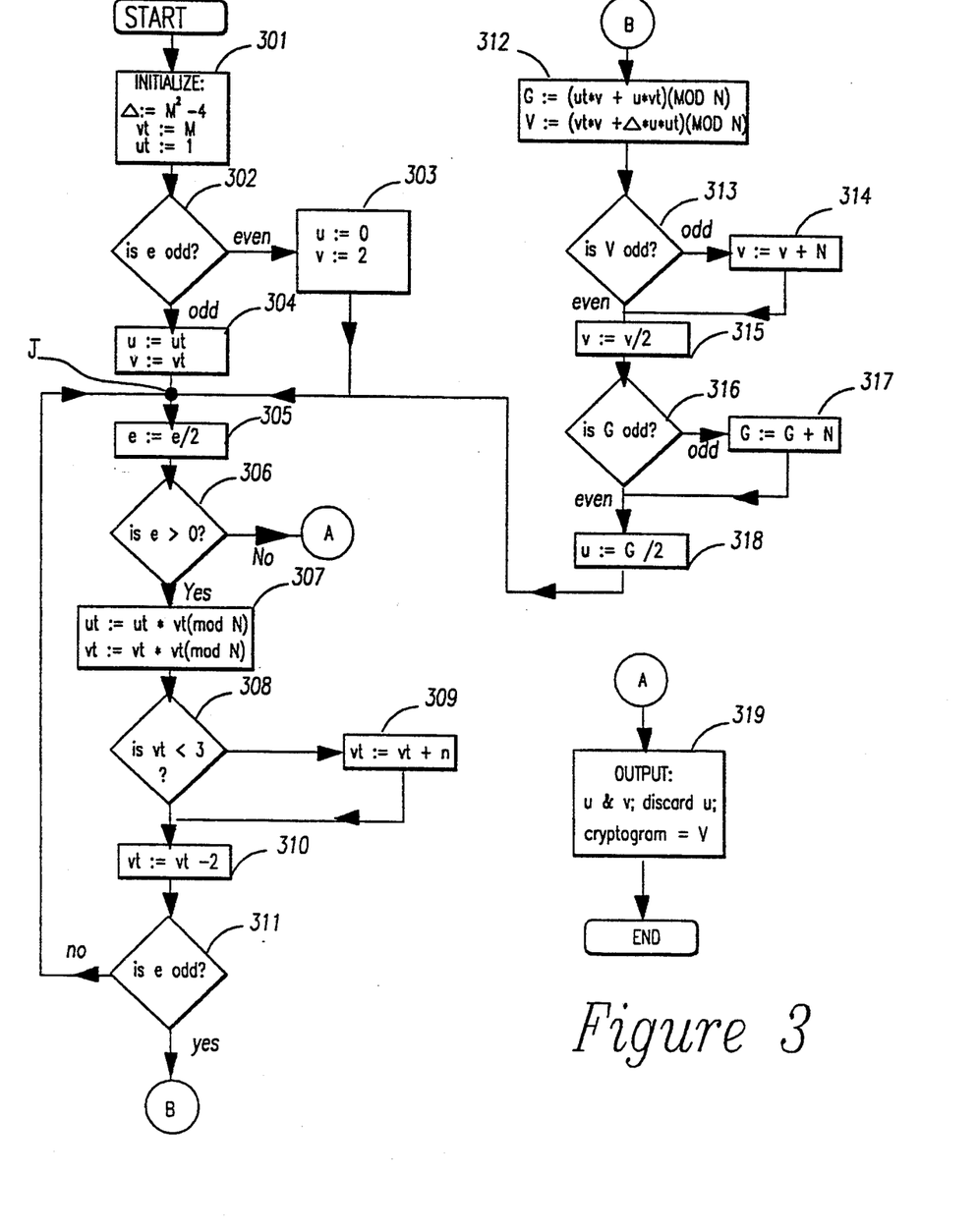
FIG. 3: is a flow chart of the mechanical steps involved in converting plain text into code.

The process by which a computer in either the encoding or the decoding terminal achieves its operation is exemplified in the flowchart of FIG. 3. The flowchart depicts but one of many possible means of achieving the objective required, which is the calculation of a Lucas function for various inputs. In alternative embodiments other of these means may be employed in keeping with the present invention. Furthermore, as Lucas functions are but one type of what are known as higher order linear recurrences, these others may be utilized in yet further embodiments in keeping with the present invention.

For an input message block M, an index e, and modulus N, the computer initializes the variables $\Delta$ (delta) as equal to M multiplied by itself once, and then four subtracted. The variable vt is set equal to M, and the variable ut is set equal to one. This happens in Box 301.

In decision Box 302, the computer decides whether or not e is an odd number. If it is not, then Box 303 is performed, so that the initial value of variable u is set to equal zero, and the initial value of the variable v is set to equal two: if e is an odd number, then Box 304 is performed, in which the initial value of u is set equal to that given to ut, and the initial value of v is set equal to vt. Both streams of possibility merge at Junction J.

In Box 305, the e is divided by two, with only the whole number quotient retained as the value of e.

In Box 306, the value of e is tested to see whether it is greater than zero. If it is not, then the computer has finished the calculation, and proceeds to Box 319, Output. For a given e which is greater than zero, division by two and keeping only a whole number quotient will eventually produce an e value which is zero. It is this which ensures that the computation is finite.

If the value of e is greater than zero, then in Box 307, ut is replaced by the product of the last ut with the last vt, reduced modulo N. Similarly, vt is the product of the last vt times itself, reduced modulo N.

Next encountered is decision Box 308, which tests whether the value of vt is less than three. If it is, then Box 309 is reached, which adds the value of N to vt. The stream then joins that of the case when vt is greater than or equal to three, and two is subtracted from vt in Box 310.

Decision Box 311 is next. This tests whether e is odd: if it is not then the process branches back to Junction J, to rejoin at Box 305; if the value of e is odd, then Box 312 is done.

In 312, the variable G is set equal to the sum of the products of ut and v with u and vt, reduced modulo N. As well, v is set equal to the sum of the product of the previous v and vt with the product of A, the previous u, and ut, reduced modulo N.

Decision Box 313 follows: if the value of v is odd then Box 314 adds N to the value of v, to join what happens otherwise, namely the halving of the value of v in box 315.

Decision Box 316 follows: if the value of G is odd then Box 317 adds N to the value of G, to join what happens otherwise, namely the halving of the value of G in box 318.

At this point the stream returns to Junction J.

On the value of e reaching zero, the process discards the value of u, and outputs the value of the cryptogram v, so that $$v = V_e(M,1) \ (modulo \ N).$$

Figure 4:
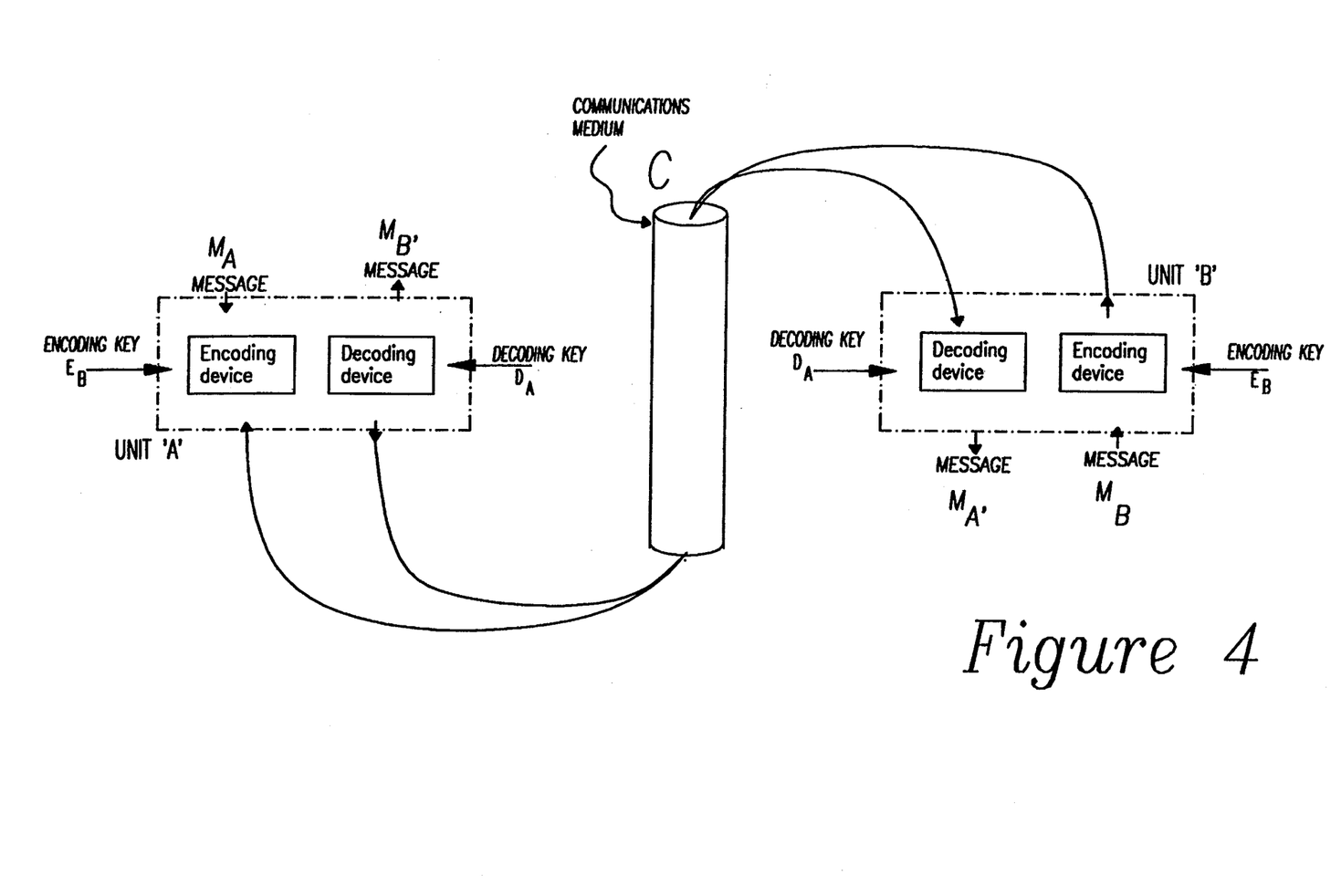
FIG. 4: is a diagram of a two-way communications channel carrying encrypted messages between unit/terminal A and unit/terminal B, using a decoding key and an encoding key at each end.

The communications system illustrated in FIG. 2 is suitable for one-directional communicating messages from terminal A to terminal B. FIG. 4 illustrates a similar configuration which accommodates the two-way transmission of messages between terminals A and B. In a similar manner, additional terminals may be added to the network (with suitable selection of encoding keys for each desired communication) and coupled to the communications channel 10 by way of conventional modulator and demodulator networks and terminal addressing networks to control the appropriate flow of messages from originating terminal to a desired receiving terminal.

In the FIG. 4 configuration, separate encoding and decoding devices are shown for each terminal. However, as noted above, the encoding and decoding devices perform substantially the same functions but with different input message and key signals. Accordingly, each of the stations or units at remote location A and B in the FIG. 4 configuration may be replaced by a single device which may be operated as either an encoding or a decoding device with appropriate switches to control the message input (M or C) and key input (E or D). In the configuration of FIG. 4, the origin for the message, reconstituted plain text and ciphertext is denoted by subscripts representative of the respective originating terminal. In addition, the encoding and decoding keys are representative by the letters E and D with subscripts representative of the associated terminal. For example, since terminal A is communicating with terminal B, the encoding key is denoted $E_B$ so that the decoding terminal B may apply its decoding key $D_B$ to extract the message M' of A ($=M_A$). For cases where terminal A wishes to communicate with a third terminal, for example, terminal C, the encoding key for the terminal A encoding device 14A would be replaced with a corresponding encoding key $E_c$ for terminal C.

Figure 5:
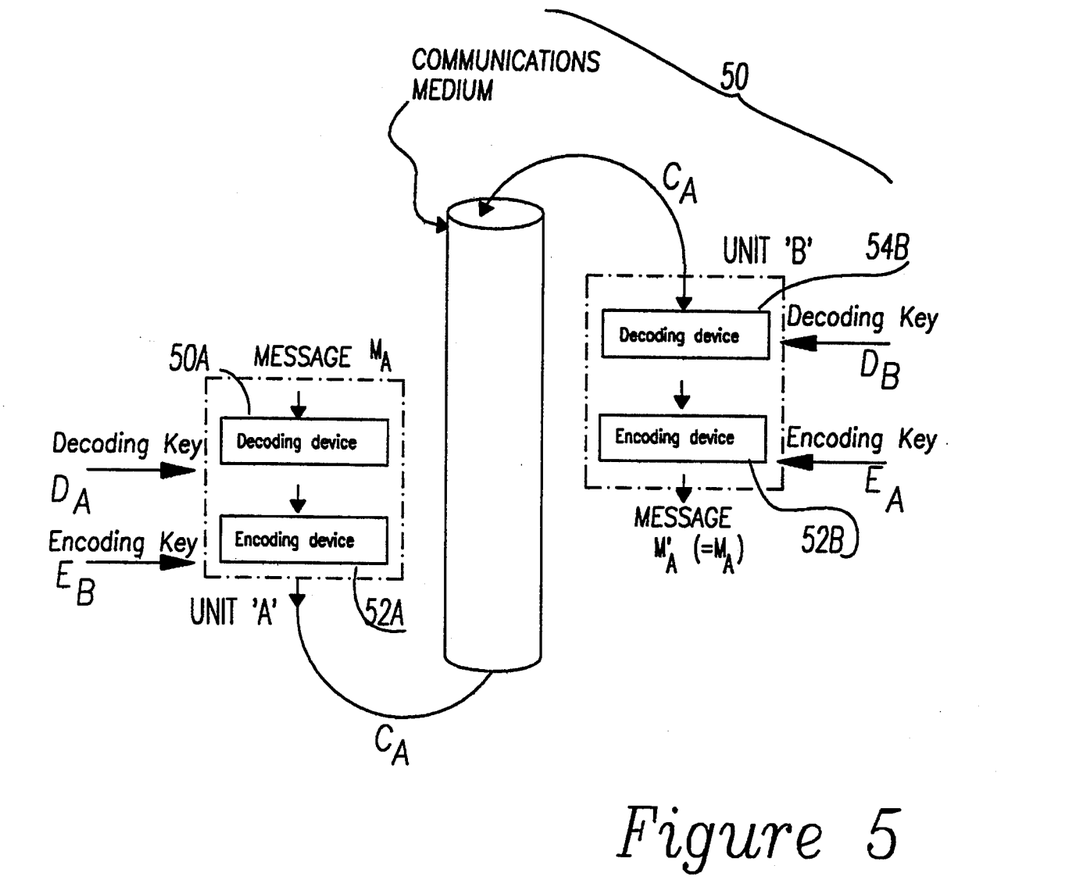
FIG. 5: is a diagram of a one-way communications channel carrying encrypted messages from unit/terminal A to unit/terminal B, using a decoding key and an encoding key at each end; the message passing through both stages in each unit.

FIG. 5 shows an embodiment of a communication system in accordance with the present invention for transmitting signed messages from terminal A to terminal B over the communication channel 50. In this configuration, the terminal A includes an encoding device 12A which corresponds to the encoding device 12 in the FIG. 2 configuration and which similarly transforms a message to ciphertext using the encoding key for the intended receiver terminal (i.e. terminal B in this case). In addition, terminal A includes a decoding device 40A which is similar in form to the decoding device 14 (FIG. 2) but which utilizes the decoding key $D_A$ associated with terminal A as the key for that device 40A. The device 40 transforms the message to be transmitted $M_A$ to a signed message $M_{As}$ which in turn is applied as the message word input to device 12A. Device 12A provides a signed ciphertext word $C_A$, which is representative of the signed message word as enciphered for reception by terminal B. $C_A$, is transferred to terminal B over channel 10.

Terminal B includes a decoding device 54B which corresponds to the decoding device 24 in the FIG. 2 configuration and which transforms received signed ciphertext word $C_A$ to the signed message word $M_{As}$ using terminal B's decoding key $D_B$. In addition, terminal B includes an encoding device 52B which is similar in form to the encoding device 52A, but which utilizes the signed message word $M_{As}$ as its data input and the encoding key $E_A$ associated with terminal A as the key for that device 52B. Device 52B transforms the signed message word $M_A$ to the unsigned message word $M_{A'}$, which corresponds to the original message $M_A$. Thus, all of the devices 52A, 54B, 50A and 52B are substantially the same in function but they utilize the indicated encoding or decoding keys and data inputs.

In alternative embodiments, the order of the enciphering and signing operations may be switched, provided that the order of the corresponding deciphering and unsigning operations are similarly switched. Furthermore, additional levels of enciphering or signing may also be utilized so long as there is a corresponding deciphering or unsigning operation.

Figure 6:
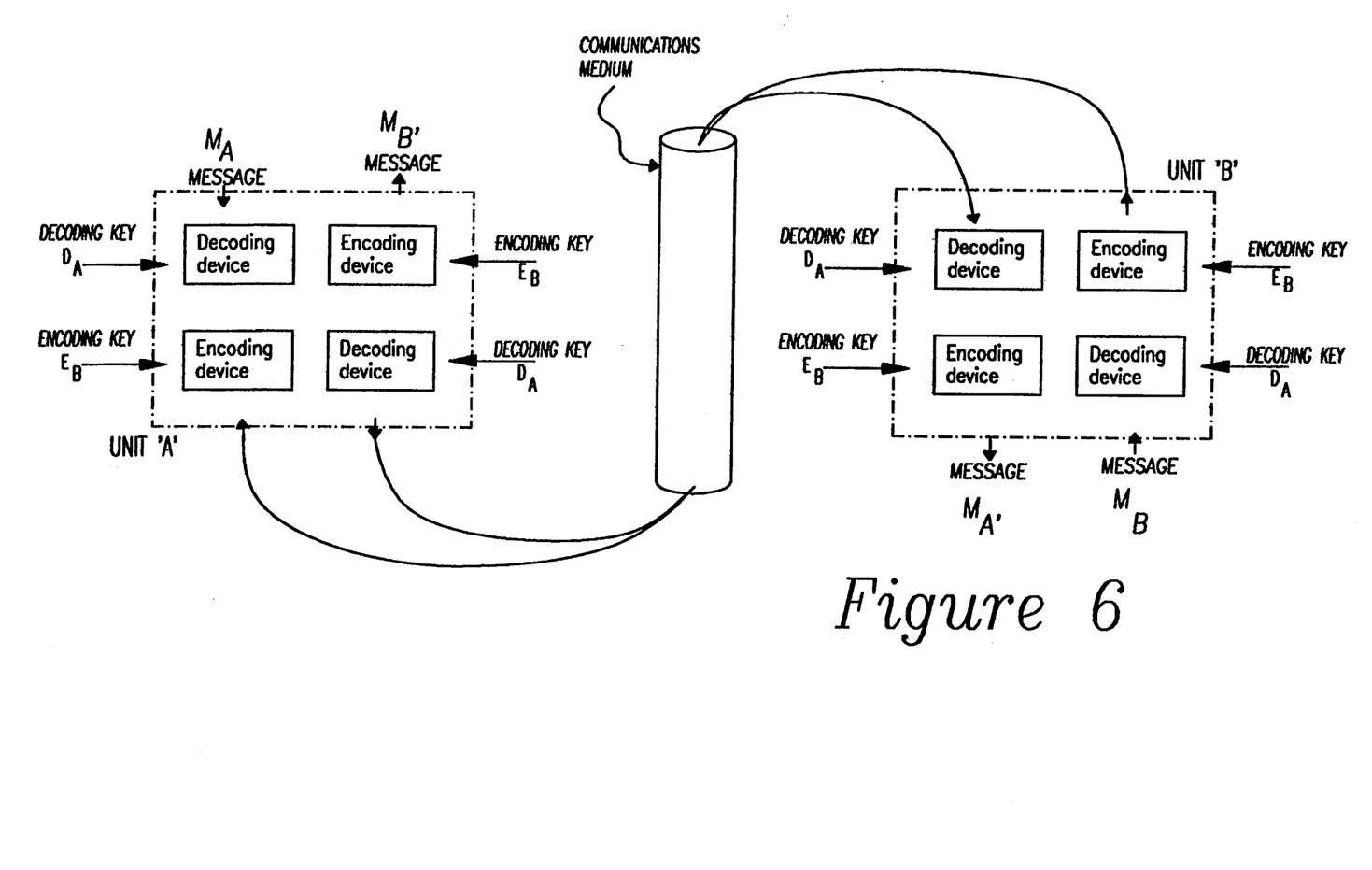
FIG. 6: is a diagram of a two-way communications channel carrying encrypted messages between unit/terminal A and unit/terminal B, using a decoding key and an encoding key at each end; the message passing through both stages in each unit.

While the system in FIG. 5 is suitable for signal direction transmission of a message from terminal A to terminal B, terminal B may also include blocks corresponding to blocks 52A and 50A and terminal A may include blocks corresponding to blocks 54B and 52B with the respective keys $E_A$, $D_B$ $D_A$ and $E_B$ as shown in FIG. 6. With the latter system, two-way signed digital communications may be accomplished. In alternative configurations, additional terminals may be utilized using the addition of similar blocks coupled to the channel 50, with the appropriate keys and modem and addressing networks.

Figure 7:
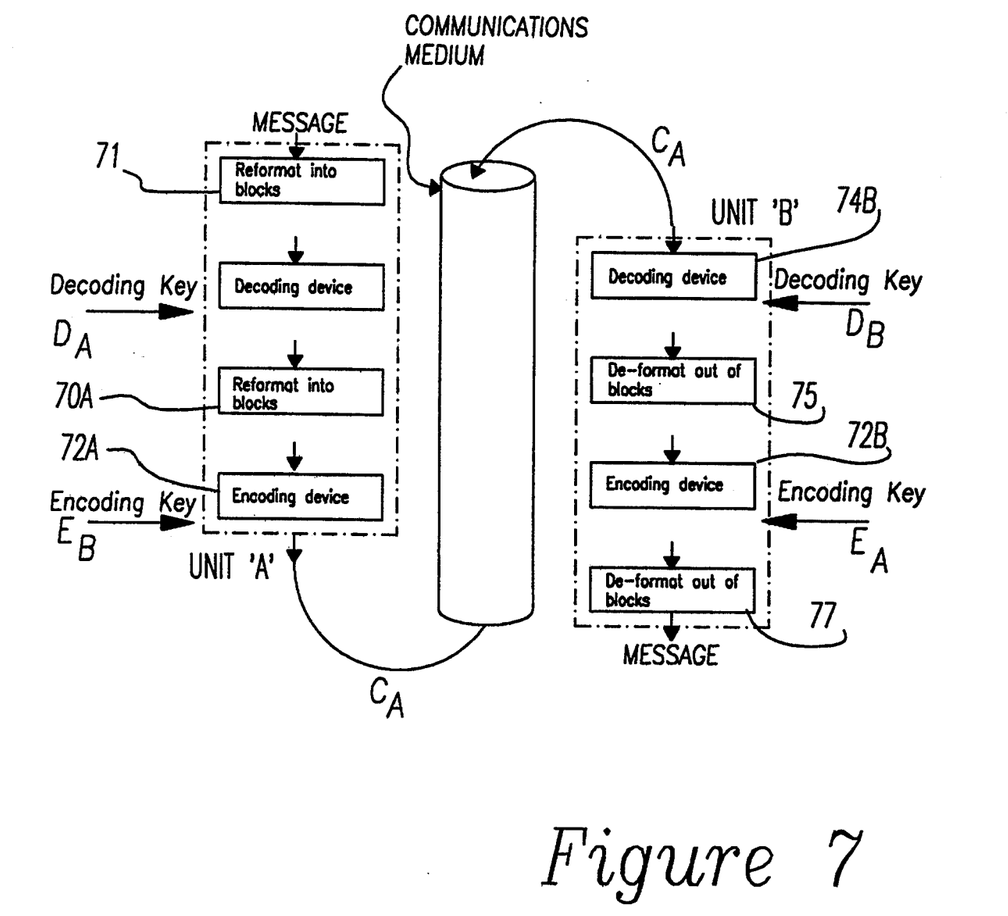
FIG. 7: is a diagram of a one-way communications channel carrying encrypted messages from unit/terminal A to unit/terminal B, using a decoding key and an encoding key at each end; the message being formatted into discrete blocks of numbers in unit A and passing through both stages in each unit, finally being deformatted before emergence.

The signature systems described above in conjunction with FIGS. 2, 4, 5 and 6 are suitable where the respective message and ciphertext words represent numbers less than the n, for the particular transformations. As noted above, when the words to be transformed (either by encoding or decoding) are initially beyond the nominal range requirement, a blocking subsystem is used to break the word into blocks within that range before the transformation is performed. A corresponding unblocking subsystem is utilized following the inverse transformation at the receiving terminal to obtain the original message. FIG. 7 shows an exemplary configuration which is similar to the configuration of FIG. 5, but which also includes blocking and unblocking subsystems. Terminal A of the configuration of FIG. 7 includes a first blocking subsystem 71 which precodes the message to a blocked message $M_A$, which in turn is transformed by device 70A to a signed message $M_A$ to blocks $M_{A''}$ each block of which is then transformed by device 72A to a signed ciphertext word $C_A$. At unit or terminal B, $C_A$ is first transformed to signed message blocks by device 74B, which are then transformed by a first unblocking subsystem 75 to the signed message word $M_A$. The word M is then transformed by device 72B to the blocked message $M_A$, which is in turn transformed by a second unblocking subsystem 77 to the original message. In embodiments where the message is enciphered before signing, the device that first provides $C_A$ which is transformed to $C_{A''}$ and then to $C_A$. At the receiving terminal $C_A$ is first transformed to $C_{A''}$ which is then transformed to $C_A$ and then decoded to $M_A$. The blocking and unblocking subsystems may be configured with any of the various forms of the present invention wherein the respective message and ciphertext words are outside the nominal ranges. Where the range requirements for a word transformation are met, the blocking and unblocking subsystems are not utilized.

WORKED EXAMPLE

In this example the sign "≡" refers to modulus equality.

The blocking and unblocking and enciphering and deciphering for this invention will be illustrated for an example with p=1949, q=2089, N=p*q=4071461, e=1103 and d chosen from {$d_1$=674831, $d_2$=55367, $d_3$=564167, $d_4$=24017} in order to encipher and decipher the message:

TAKE ME TO YOUR LEADER

Substitute a two-digit number for each letter, such that A=01, B=02, C=03, ..., Z=26 and let blank=27.

This converts the message to:

M=200111052713052720152725152118271205010405182727

Since this M is larger than the seven decimal digits of N, M must be split into blocks of six digits, so that $M_1$=200111, $M_2$=052713, $M_3$=052720, $M_4$=152725, $M_5$=152118, $M_6$=271205, $M_7$=010405, $M_8$=182727

Seven digits must be allowed for ciphertext blocks.

Using the Lucas function calculation method $C_1 = V_e(M_1,1) \pmod{N} = V_{1103}(200111,1) \pmod{4071461} = 2836053$ For the entire message obtain the ciphertext:

$C_1$=2836053, $C_2$=880697, $C_3$=523364, $C_4$=2992731, $C_5$=3530018, $C_6$=651098, $C_7$=522000, $C_8$=2710417

The ciphertext is deciphered in the same manner, except that each block determines which of $d_1$, $d_2$, $d_3$ or $d_4$ is used.

For $C_1$, $\Delta_1 = C_1^2 - 4$; calculate the Legendre symbol with respect to p & q, getting ($\Delta_1/p$)=1, ($D_1/q$)=−1. This means choosing $d_2$, so $$M_1' = V_{d_2}(C_1, 1) \pmod{N}$$
$$= V_{55367}(2836053,1) \pmod{4071461}$$
$$= 200111 \; (=M_1)$$

For $C_2$, $\Delta_2 = C_2^2 - 4x$); Legendre symbol with respect to p (i.e. ($\Delta_2/p$)=1) is −1 and with respect to q (i.e. ($\Delta_2/q$) is 1, so choose $d_3$.

$$M_2' = V_{d_3}(C_2, 1) \pmod{N} = V_{564167}(880697,1) \pmod{4017461}$$
$$= 52713.$$

Now 52713 is only five digits long, so add a zero to its left to give $M_2$=052713.

For $C_3$, ($\Delta_3/p$)=−1 and ($\Delta_3/q$)=−1, so choose $d_4$ $$M_3' = V_{d_3}((3,1) \pmod{N} = V_{24017}(523364,1) \pmod{4071461}$$
$$= 52720.$$

Once again, 52720 has only five digits, add a zero to the left to give $M_3$=052720.

For $C_4$, ($\Delta_4/p$)=1 and ($\Delta_4/q$)=1, so choose $d_1$.

$$M_4' = V_{d_1}(C_4,1) \pmod{N} = V_{674831}(2992731,1) \pmod{4071461}$$
$$= 152725 = M_4$$

For $C_5$, ($\Delta_5/p$)=−1 and ($\Delta_5/q$)=−1, so choose $d_4$ $V_{d_4}(C_5,1) \pmod{N} \equiv 152118 = M_5$ For $C_6$, ($\Delta_6/p$)=1 and ($\Delta_6/q$)=−1, so choose $d_2$ $M_6' = V_{d_2}(C_6,1) \pmod{N} \equiv 271205 = M_6$ For $C_7$, ($\Delta_7/p$)=1 and ($\Delta_7/q$)=1, so choose d, $M_7' = V_{d_1}(C_7,1) \pmod{N} \equiv 10405.$ Add in zero left gives $M_7$=010405.

For $C_8$, ($\Delta_8/p$)=1 and ($\Delta_8/q$)=1, so choose $d_3$ $M_8' = V_{d_3}(C_8,1) \pmod{N} \equiv 182727 = M_8$ Consequently the deciphered message reads:
200111052713052720152725152118271205010405182727

Dividing this into pairs of digits gives:
20 01 11 05 27 13 05 27 20 15 27 25 15 21 18 27 12 05 01 04 05 18 27 27 which, with letters substituted under the initial scheme, gives:

TAKE ME TO YOUR LEADER

```
20 01 11 05 27  13 05 27  20 15 27  25 15 21 18 27  12 05 01 04 05 18 27 27
 T  A  K  E  M  E   T  O    Y  O  U  R    L  E  A  D  E  R
```

In a public key cryptosystem and signature system which uses the present invention, each user has a public encrypting key E=(e,N), which can be publicly known, and a secret decrypting key D=(d ,N), with j=1 through 4. The security of the system depends on the secret D key not being known, and on its not being able to be found or derived from E from the equation e·$d_j$=1 (modulo $L_j$), for j=1 through 4, where $L_j$ is as defined earlier, the least common multiple in the four cases that can arise. In turn, the security is thus displaced on the four values of L, and these in turn depend on the values of p and q, the two (or more) prime factors of N, the composite modulus.

If p and q are selected as large prime numbers so that N is more than, for example, $10^{150}$, or more preferably two to three hundred decimal digits in length, then the determination of p and q from N (which is published as part of the public key) is in practice completely unfeasible.

In the years since the announcement of the RSA cipher, the problem of factoring has proved to be as difficult as it was at the outset. As such, it has become the problem of choice on which later signature systems have been based. (See S. Goldwasser, S. Micali, R. L. Rivest, "A secure digital signature scheme" SIAM J. Comput., Volume 17, No. 2, April 1988, pp 285–286).

The present cipher of this invention has an advantage over many such ciphers in that it is not multiplicative. In other words $V_e(A,1) \cdot V_e(B,1)$ is not equal to $V_e(A \cdot B,1)$ Consequently the present invention is not selectively forgeable under known methods of doing so with multiplicative ciphers. In particular, an interloper who knows the ciphers of two or more individual messages, but does not know the prime factors of N, can not in any way combine those two known ciphers to create a third, composite enciphered message.

The Lucas functions can be expressed as polynomials in P, modulo N, and these special polynomials can be inverted only with knowledge of the prime factors of N.

In alternative embodiments, the present invention can use two or more primes in making up the product N, for the modulus. The calculations of signing and decoding, which allow knowledge of the secret primes making up the modulus, can be simplified by performing the calculations modulo the individual primes, and at the end combining results using the Chinese Remainder Theorem or other ways to produce the modulo N end result. By this means, the time taken to decode enciphered messages can be reduced to a fraction of that taken by a single decoding computer, in proportion to the number of computers applied to the task. The decoding process often forms a bottleneck in communication systems, so that speeding this part of the process may quite markedly improve the speed of communication overall.

As such, the present invention could find expression in a set-up which devoted a number of computers equal to the number of primes making up N. This parallelism can be immediately applied to the current invention, as at least two primes are needed to form the modulus N.

Similarly, the following variations on the use of the encoding/decoding devices are to be considered as obvious to one skilled in the prior art and therefore within the intended scope of the attached claims:

(1) using the encoding/decoding devices in cipher-feedback mode instead of the simple block encoding method described here, or as a pseudo-random number generator for use to generate pads.

(2) signatures may be effected by signing a transformed version of the message, where the transformation is publicly known and is not necessarily invertible. (It may, for example, compress the message to be signed into a shorter form, thus giving shorter signatures)

(3) using the present invention to transmit keys to be used in another encryption method for encoding subsequent messages.

Various other alterations or modifications may be made to the foregoing without departing from the scope of this invention as set forth in the following claims.

We claim:

1. A cryptographic communications system for communicating securely over an insecure communications channel by transmitting an electronic signal message from a transmitter to a receiver comprising means for enciphering the message with an encryption key at the transmitter to form a cryptogram, means for transmitting the enciphered message from the transmitter to the receiver, means for deciphering the enciphered message at the receiver with a decryption key, wherein the means for enciphering the message as a cryptograph at the transmitter comprises computation means which encodes the message by means of a higher order linear recurrence chosen from the class of Lucas functions.

2. A cryptographic communications system as recited in claim 1, wherein:
   the encryption key includes a pair of encryption numbers e and N;
   the decryption key includes a set of decryption numbers D;
   and the decryption numbers of the set D are derived from e and at least two prime factors p and q of N.

3. A cryptographic communications system as recited in claim 2, further including means to digitize a message, and means to separate said digitized message M into sections $M_i$, each said section comprising a number greater than or equal to zero, and less than N.

4. A cryptographic communications system as recited in claim 3, wherein each section $M_i$ of the message M is encoded to produce a matching section $C_i$ of said cryptogram, according to the following means:

$$C_i = V_e(M_i,1) \ (modulo \ N)$$

wherein $V_e$ is the $e^{th}$ Lucas function with respect to $(M_i,1)$ (modulo N).

5. A cryptographic communications system as recited in claim 4, wherein e is relatively prime to all of (p−1), (q−1), (p+1) and (q+1).

6. A cryptographic communications system as recited in claim 4, wherein the set of numbers D is made up of at least four positive whole numbers, $d_j$, where j comprises one of 1, 2, 3 or 4;
   one of these numbers being calculated from each particular cryptogram block, $C_i$, in the following manner:

a value $\Delta_i$ is calculated as $C_i^2 - 4$;

$\Delta$ is determined to be either a quadratic residue or a quadratic non-residue of each of the prime factors of N;

the value of $d_j$ is determined in relation to $\Delta$ as the multiplicative inverse of e, modulo the least common multiple of each prime factor of which $\Delta_i$ can be a quadratic residue $-1$ and each prime factor of which $\Delta_i$ can be a quadratic non-residue $+1$ resulting in one of at least four values;

and wherein the decryption of said cryptogram C into a message M' is accomplished for each section $C_i$ by the calculation:

$$M'_i = Vd_j(C_i)(modulo\ N),$$

where j comprises at least 1, 2, 3, and 4, and where $Vd_j$ is the $d_j^{th}$ Lucas function with respect to $(C_i, 1)$ (modulo N).

7. A public key cryptographic system including:

first and second communicating terminals arranged to function respectively as a transmitting and a receiving terminal for electronic signals;

an encoding device at said first terminal and a decoding device at said second terminal;

wherein said encoding device has means for encoding a message to be transmitted by transforming the message with an encryption key including encryption numbers e and N to create an encoded message, and said decoding device has means for decoding the message by transforming the message with a decryption key using the Lucas functions of the set of numbers D.

8. In a method of communicating securely over an insecure communication channel of the type which communicates an electronic signal message from a transmitter to a receiver, the improvement which comprises:

generating a public enciphering key which can be used to encipher messages destined for the receiver, the public enciphering key including two encryption numbers e and N;

generating a secret deciphering key including a set of numbers D for use at the receiver, by computing the set of numbers D from e and the prime factors of N;

processing the message at the transmitter by:

digitizing said message;

separating said digitized message into sections each comprising a number less than N;

computing a cryptogram section corresponding to each section of the digitized message, using the Lucas function of e to create an enciphered message containing the cryptogram sections;

transmitting the enciphered message;

and processing the enciphered message at the receiver to decode each cryptogram section by transforming them with the Lucas functions of the set of numbers D.

9. A method as recited in claim 8, further including the steps of:

applying a decoding process to said cryptogram in at least two parts, each said part comprising calculations in respect of one of the prime factors of N;

wherein said parts of the process are performed simultaneously by different decoding apparatus;

and assembling the results of said parts of the process to calculate a decoded message, using the Lucas functions of the set of numbers D.

10. A method of providing a digital signature for a communicated electronic signal message comprising the steps of:

providing a public verification key, including two verification numbers e and N;

generating a secret signing key including a set of numbers D wherein the numbers of the set D are derived from e and the prime factors of N such that the secret signing key is directly related to and computationally infeasible to generate from the public verification key;

processing the message to be transmitted and the secret signing key at the transmitter to generate a digital signature at said transmitter by transforming a representation of the message with the secret signing key, by calculating the Lucas function of the set of numbers D such that the digital signature is computationally infeasible to generate from the public verification key;

communicating the public verification key to the receiver;

transmitting the message and the digital signature from the transmitter to the receiver;

receiving the message and the digital signature at the receiver and transforming said digital signature with the public verification key by calculating the Lucas function of e to generate a representation of the message; and validating the digital signature by comparing the similarity of the message to the representation of the message generated from the digital signature.

* * * * *